UNITED STATES PATENT OFFICE.

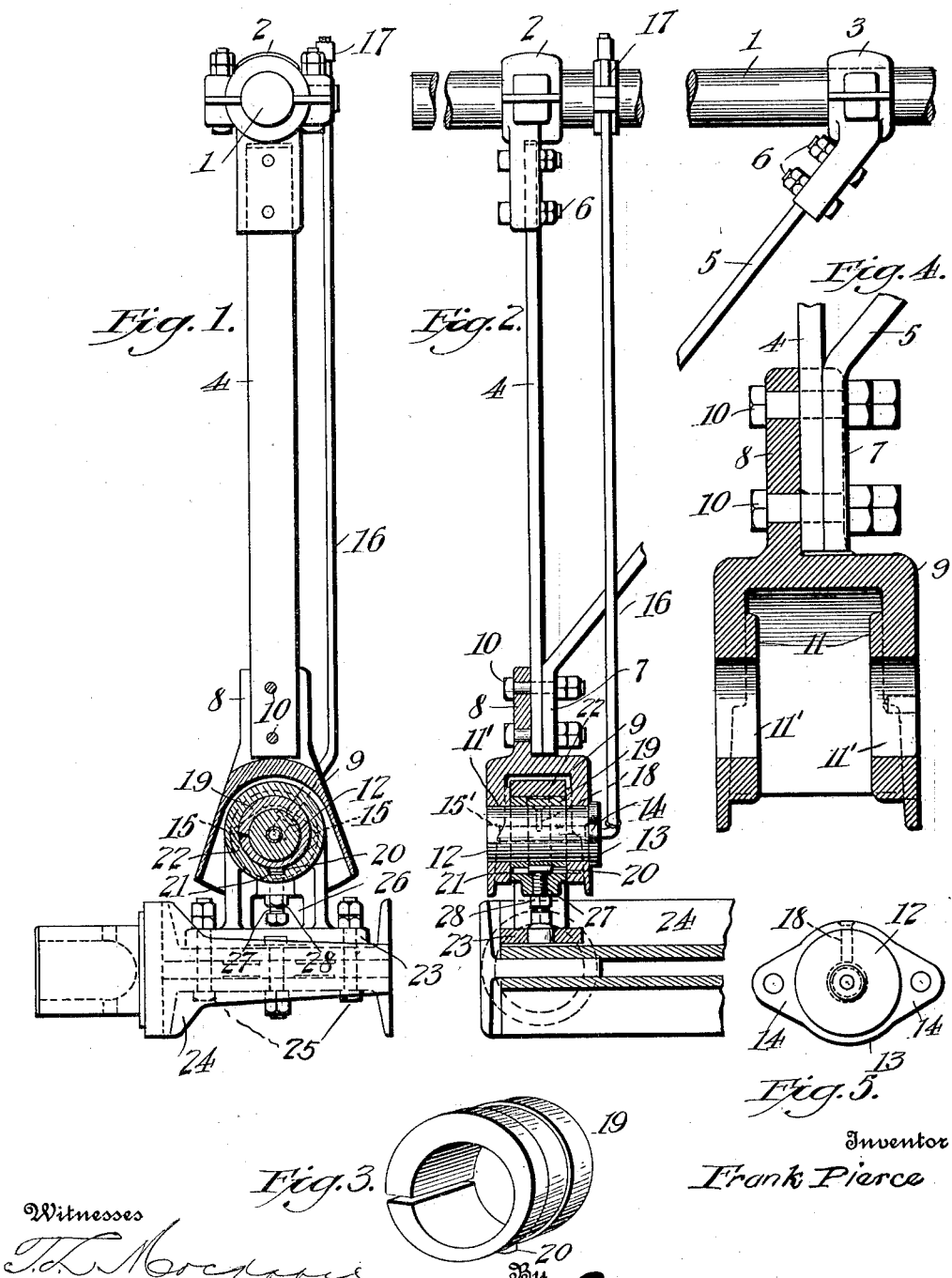

FRANK PIERCE, OF RUTLAND, VERMONT, ASSIGNOR TO LINCOLN IRON WORKS, OF RUTLAND, VERMONT, A CORPORATION OF VERMONT.

SWINGING-JACK JOURNAL FOR GANG-SAWS.

1,112,930. Specification of Letters Patent. Patented Oct. 6, 1914.

Application filed October 13, 1913. Serial No. 794,948.

*To all whom it may concern:*

Be it known that I, FRANK PIERCE, a citizen of the United States, residing at Rutland, in the county of Rutland and State of Vermont, have invented certain new and useful Improvements in Swinging - Jack Journals for Gang-Saws, of which the following is a specification, reference being had therein to the accompanying drawing.

This invention relates to certain new and useful improvements in swinging jack journals for gang saws; the object being to provide a journal for connecting the suspension rod to the gang saw frame, whereby the same will be supported firmly; means being provided for protecting the journal from the sand used in sawing the slabs.

Another object of the invention is to provide a swinging jack journal which is exceedingly simple and cheap in construction and one in which means is provided for lubricating the journal through the suspension rod pin in such a manner that the same will be thoroughly lubricated without any danger of becoming clogged by the dirt and dust.

Another object of the invention is to provide means for protecting the suspension rod pin in the form of an eccentric bronzed bushing which can be adjusted by a set screw.

Another object of the invention is to provide a journal in which the lower end of the suspension rod carries a hood member forming a fork in which the bearing member carried by the gang saw frame is pivotally mounted upon the suspension rod pin in such a manner that it can be easily and quickly attached or detached; the entire bearing being inclosed within the hood.

Other and further objects and advantages of the invention will be hereinafter set forth and the novel features thereof defined by the appended claims.

In the drawings Figure 1, is a side elevation of a suspension rod showing the journal in section; Fig. 2, is an end elevation, the journal being shown in section; Fig. 3, is a perspective of the eccentric bushing, detached; Fig. 4, is a vertical enlarged section of the hood or fork for supporting the gang saw frame; and Fig. 5, is an end view of the suspension pin, detached.

Like numerals of reference refer to like parts in the several figures of the drawings.

In gang saws now in use, the gang saw frame is supported at each end and the main object of this invention is to provide a swinging jack journal for the gang saw frame which will support the frame in such a manner that the same will be free to move or swing in its cutting movement, and while I have shown one of the supports used in connection with the gang saw frame, it will be of course understood that the frame is supported at each corner.

Referring to the drawing, 1 indicates the cross bar which is carried by the frame of the sawing machine and one is preferably arranged at each end thereof and upon which is mounted spaced couplings 2 and 3 to which are connected the suspension rods 4 and 5 by bolts as shown at 6; the suspension rod 4 hanging in a vertical plane while the suspension rod 5 is arranged diagonally and forms a brace; the lower end thereof being provided with a vertical portion 7 adapted to abut against the lower end of the rod 4 and be connected to the extension 8 of a hood 9 by bolts 10 passing transversely through bores formed in the respective members and upon which are mounted lock nuts for securely holding the members together and for supporting the hood. The hood 9 is preferably cow-bell shape, the walls thereof being provided with circular bosses 11 extending inwardly from opposite sides and said bosses are provided with openings 11' through which extends a suspension pin 12 provided with a head 13 having lateral wings 14 through which cap screws 15 are adapted to pass for holding said pin in position within the openings of the hood and for preventing the same from rotating. The suspension pin is provided with a transverse bore, one end of which is closed by a plug 15' and the opposite end has an oil pipe 16 secured therein which extends upwardly and is connected to a suitable lubricating device 17 carried by the cross bar 1 and from which the lubricant is adapted to be conveyed to the suspension pin. The suspension pin is provided with a lateral or outlet 18 extending from the bore thereof to the periphery of the same through which lubricant is adapted to pass, as will be later described. Arranged upon the pin 12 is an eccentric bronzed bushing 19 provided with a central annular groove having a lug 20 projecting therefrom which fits within a notch 21 formed in the circular bearing 22 which is provided with a foot portion 23 connected to the gang saw frame 24 by bolts 25. The foot portion 23 is cut away as shown at 26 to form an opening; the upper wall of which is provided with a threaded bore extending in the notch 21 of the bearing and in which is mounted a set screw 27 adapted to engage the lug 20 of the bushing 19 for adjusting the same; said set screw being locked by a lock nut 28 in its adjusted position and it will be seen by this construction, that the bearing is mounted upon a bronzed bushing carried by a stationary suspension pin in such a manner that the wear of the bushing can be taken up in order to compensate for any lost motion.

In the construction of jack journal as herein shown and described, the jack constituting the bearing 22 having the foot portion 23, is rigidly attached to the gang saw frame and in use, one of these jacks is placed in position upon each corner of the gang saw frame and securely bolted thereto.

The suspension fork or hood, is provided with oppositely disposed bosses, so constructed that the same fit snugly over the bearing portion of the jack and by forming the suspension pin with a head as shown for rigidly attaching the same to the rectangular-shaped hood, it is of course seen, that the same is prevented from rotating and when the bushing is in position thereon, the lug carried thereby extends into the recess or notch formed in the bearing 22 and by forming the same eccentric, when the screw is tightened, the same will be forced tightly around the suspension pin within the bearing in order to form an exceedingly tight joint and by constructing the suspension fork in the form of a rectangular hold, the lower end of which extends down beyond the bearing, the same is thoroughly protected from the sand and dirt arising from the sawing machine, whereby the life of the bearing is greatly increased. In connection with this form of bearing, a novel lubricating means is employed whereby oil is injected into the bearing or central portion of the bushing in order to thoroughly lubricate the same.

From the foregoing description, it will be seen that I have provided a swinging jack journal for a gang saw frame in which a stationary jack or bearing is fixed to the gang saw frame in which jack oscillates a suspension pin rigidly attached to the suspension hood and over which is arranged an eccentric bushing for taking up wear; the parts being so arranged and connected together that all danger of the same becoming accidentally separated when in operation, is prevented and an exceedingly simple and cheap construction is formed, which has many advantages over gang saw bracket supports, now in use.

In swinging jack journals of this character, the bushings or supporting pins of the gang saw frame soon wear to such an extent that the frame wabbles in its movement and a clear cut is not obtained, while with my construction, I have provided a convenient way of taking up the wear by means of a split eccentric bushing which enables the supporting bearings to be adjusted so as to maintain the gang saw frame in a true position in its swinging movement, and as this is most important in stone sawing machines of this character, it will be found that a great advantage has been obtained by providing means for compensating for the wear of the supporting journal and while I am aware that other devices have been used they have failed to accomplish the desired result.

I claim:

1. A device of the kind described, comprising a rectangular-shaped hood having oppositely disposed openings and provided with oppositely disposed internal bosses, of a bearing arranged between said bosses, an eccentric bushing arranged within said bearing, a suspension pin fixed to said hood extending through said bushing, means for adjusting said bushing, and means for connecting said bearing to the gang saw frame.

2. A swinging jack journal for gang saws, comprising a bearing having a foot portion for connecting it to the gang saw frame, said bearing having a notch, an eccentric bushing arranged within said bearing having a projection extending into said notch, a set screw carried by said bearing engaging said projection, a hood arranged over said bearing, a suspension pin carried by said hood extending through said bushing, and suspension rods having a connection with said hood.

3. A swinging jack journal for gang saws having a suspension pin provided with a lubricating bore having a lateral, an eccentric bushing surrounding said eccentric pin, a support for said pin, a bearing surronding said bushing, and means for connecting said bearing to the gang saw frame.

4. A device of the kind described, comprising a bell-shaped hood, having an extension provided with internally oppositely disposed bosses, a suspension pin fixed to said hood extending through said bosses, suspension rods connected to said extension, a bushing surrounding said suspension pin, means for adjusting said bushing, a bearing arranged upon said bushing within said hood, and means for connecting said bearing to the gang saw frame.

5. A swinging jack journal for gang saws, comprising a hood member having a suspension rod connected thereto, a fixed bearing, a set screw carried by said bearing, a suspension pin carried by said hood member extending through said bearing, and an eccentric bushing surrounding said suspension pin adapted to be engaged by said set screw for adjusting said bushing within said bearing.

6. In a device of the kind described, the combination with a bell-shaped hood having an extension connecting the same to a suspension rod, of a bearing arranged within said hood having a foot for connecting the same to the gang saw frame, a suspension pin extending through said hood and bearing, an eccentric bushing arranged on said pin within said bearing, said pin being provided with a lubricating bore, and an oil pipe connected to one end of said bore for supplying lubricant thereto.

In testimony whereof I affix my signature in presence of two witnesses.

FRANK PIERCE.

Witnesses:
PERCY W. ADAMS,
R. H. DAVIS.

Copies of this patent may be obtained for five cents each, by addressing the "Commissioner of Patents, Washington, D. C."